US007844385B2

(12) United States Patent
Loda et al.

(10) Patent No.: US 7,844,385 B2
(45) Date of Patent: Nov. 30, 2010

(54) MICROSERVER ENGINE CONTROL CARD

(75) Inventors: David C. Loda, Bolton, CT (US); Douglas P. Stetson, Colchester, CT (US); C. Bruce Wood, Ellington, CT (US); Peter Joseph Padykula, Brimfield, MA (US)

(73) Assignee: United Technologies Corporation, Hartford, CT (US)

( * ) Notice: Subject to any disclaimer, the term of this patent is extended or adjusted under 35 U.S.C. 154(b) by 1443 days.

(21) Appl. No.: 10/767,601

(22) Filed: Jan. 28, 2004

(65) Prior Publication Data
US 2005/0165534 A1 Jul. 28, 2005

(51) Int. Cl.
*G01M 17/00* (2006.01)
(52) U.S. Cl. ...................... 701/100; 702/182
(58) Field of Classification Search ............ 701/1, 701/3, 23, 29, 33, 35, 100; 235/379, 380; 709/40 R, 223; 340/500; 702/182, 185
See application file for complete search history.

(56) References Cited
U.S. PATENT DOCUMENTS

| | | | |
|---|---|---|---|
| 3,710,568 A * | 1/1973 | Rice | 60/796 |
| 5,445,347 A | 8/1995 | Ng | |
| 5,778,381 A | 7/1998 | Sandifer | |
| 5,828,969 A | 10/1998 | Chamney et al. | |
| 5,838,261 A | 11/1998 | Lauta et al. | |
| 5,884,202 A | 3/1999 | Arjomand | |
| 5,931,877 A | 8/1999 | Smith et al. | |
| 5,931,878 A | 8/1999 | Chapin et al. | |
| 6,047,165 A | 4/2000 | Wright et al. | |
| 6,104,914 A | 8/2000 | Wright et al. | |
| 6,108,523 A | 8/2000 | Wright et al. | |
| 6,112,246 A | 8/2000 | Horbal et al. | |
| 6,115,656 A | 9/2000 | Sudolsky | |
| 6,141,584 A | 10/2000 | Rockwell et al. | |
| 6,148,179 A | 11/2000 | Wright et al. | |

(Continued)

FOREIGN PATENT DOCUMENTS

CA 2486084 7/2005

(Continued)

OTHER PUBLICATIONS

P. Urien, Internet Card, a Smart Card as a True Internet Node, Computer Communications, Nov. 1, 2000, vol. 23, No. 17, Amsterdam, the Netherlands, pp. 1655-1666.

(Continued)

*Primary Examiner*—Dalena Tran
(74) *Attorney, Agent, or Firm*—Bachman & LaPointe, P.C.

(57) ABSTRACT

An integrated system for monitoring a deployed product on a movable platform, gathering data about the deployed product, and disseminating the, data about the deployed product is disclosed. The system includes a server located on the movable platform capable of communication with the server from a remote location. The server communicates with a source of data about the deployed communicates with a source of data about the deployed product. The system further includes a portal onto which data gathered by the server may be downloaded and with which one can upload information to the server. The server may be provided in the form of a card adapted to be mounted into a pre-existing electronic controller of the deployed product.

16 Claims, 3 Drawing Sheets

U.S. PATENT DOCUMENTS

| | | | |
|---|---|---|---|
| 6,154,636 A | 11/2000 | Wright et al. | |
| 6,154,637 A | 11/2000 | Wright et al. | |
| 6,234,176 B1 | 5/2001 | Domae et al. | |
| 6,324,659 B1 * | 11/2001 | Pierro | 714/48 |
| 6,353,734 B1 | 3/2002 | Wright et al. | |
| 6,370,454 B1 | 4/2002 | Moore | |
| 6,487,479 B1 | 11/2002 | Nelson | |
| 6,522,867 B1 | 2/2003 | Wright et al. | |
| 6,529,620 B2 | 3/2003 | Thompson | |
| 6,542,856 B2 * | 4/2003 | Frantz et al. | 702/188 |
| 6,728,610 B1 * | 4/2004 | Marshall et al. | 701/30 |
| 6,804,612 B2 * | 10/2004 | Chow et al. | 702/34 |
| 6,853,930 B2 * | 2/2005 | Hayashi et al. | 702/61 |
| 6,990,432 B1 * | 1/2006 | McCarthy et al. | 702/184 |
| 7,050,943 B2 * | 5/2006 | Kauffman et al. | 702/188 |
| 7,065,471 B2 * | 6/2006 | Gotoh et al. | 702/183 |
| 7,149,632 B1 * | 12/2006 | Gao et al. | 702/34 |
| 2001/0036822 A1 | 11/2001 | Mead et al. | |
| 2002/0018008 A1 | 2/2002 | Wright et al. | |
| 2002/0059614 A1 | 5/2002 | Lipsanen et al. | |
| 2002/0087992 A1 | 7/2002 | Bengeult et al. | |
| 2002/0095476 A1 | 7/2002 | Craik | |
| 2002/0111720 A1 | 8/2002 | Holst et al. | |
| 2002/0118137 A1 | 8/2002 | Halsema et al. | |
| 2002/0120412 A1 | 8/2002 | Hayashi et al. | |
| 2002/0123915 A1 | 9/2002 | Denning et al. | |
| 2002/0143443 A1 | 10/2002 | Betters et al. | |
| 2002/0160773 A1 | 10/2002 | Gresham et al. | |
| 2002/0168975 A1 | 11/2002 | Gresham et al. | |
| 2002/0178451 A1 | 11/2002 | Ficco | |
| 2003/0009761 A1 | 1/2003 | Miller et al. | |
| 2003/0014426 A1 | 1/2003 | Gimbert et al. | |
| 2003/0032426 A1 | 2/2003 | Gilbert et al. | |
| 2003/0048471 A1 | 3/2003 | Lundgren | |
| 2003/0064714 A1 | 4/2003 | Sanford et al. | |
| 2003/0084451 A1 | 5/2003 | Pierzga | |
| 2003/0085818 A1 | 5/2003 | Renton et al. | |
| 2003/0093798 A1 | 5/2003 | Rogerson | |
| 2003/0100978 A1 | 5/2003 | Wright et al. | |
| 2003/0105544 A1 | 6/2003 | Kauffman et al. | |
| 2003/0105565 A1 | 6/2003 | Loda et al. | |
| 2004/0206818 A1 | 10/2004 | Loda et al. | |
| 2005/0027826 A1 | 2/2005 | Loda et al. | |

FOREIGN PATENT DOCUMENTS

| | | |
|---|---|---|
| CA | 2486088 | 7/2005 |
| EP | 1283339 A1 | 2/2003 |
| EP | 1316908 A1 | 6/2003 |
| KR | 2005-71097 | 8/2005 |
| WO | WO 01/80494 | 10/2001 |
| WO | 03054439 A2 | 7/2003 |

OTHER PUBLICATIONS

European Search Report for EP Patent Application No. 04257157.0.
Korean Office Action, for Korean Patent Application No. 10-2005-71109, dated Aug. 16, 2007.
EP Office Action dated Feb. 16, 2009.
Urien, P.; "Internet Card, a smart card as a true Internet node"; Computer Communications, Elsevier Science Publishers BV, Amsterdam, NL., vol. 23. No. 17, Nov. 1, 2000, pp. 1655-1666, XP004238469; ISSN: 0140-3664.
Canadian Office Action dated Aug. 27, 2009.

* cited by examiner

MICROSERVER ENGINE CONTROL CARD

CROSS-REFERENCE TO RELATED APPLICATION

This application is related to U.S. patent application Ser. No. 10/155,593, filed on May 22, 2002, which claims priority to U.S. provisional patent application Ser. No. 60/337,926, filed on Dec. 3, 2001, herein incorporated by reference.

FIELD OF THE DISCLOSURE

The present disclosure generally relates to integrated Internet systems and, more particularly, relates to the provision of an Internet portal onboard a deployed product.

BACKGROUND OF THE DISCLOSURE

There are three general types of maintenance for products. They are on-demand maintenance (usually when a product breaks), scheduled maintenance (based upon the best estimate of a manufacturer as to when something will wear out with normal usage), and condition based maintenance (maintenance that occurs when maximum usage is obtained from a part but just prior to part failure). On demand maintenance is self-explanatory. It is when a component fails and has to be repaired or replaced. This normally occurs as an end result of its operators not understanding its component life or the conditions of its use, and the highest costs, both physical and lost time, are associated with it. Unfortunately, it is also one of the most common types of maintenance. Scheduled maintenance is less costly but can be very wasteful. Depending upon the usage of the product, one may be replacing parts that still have a significantly useful life. This is also where corners tend to be cut by the customer when budgets become tight, and often leads back to the first type of maintenance described above. The third form of maintenance is condition-based maintenance and is the holy grail of maintenance in many industries. If a manufacturer or service organization can accurately ascertain the maximum life of a component based upon actual wear, tear, and usage, it could then allow for the optimized, just-in-time servicing and replacement of that component, thereby allowing for the user to gain maximum product life and to schedule the replacement at a non-critical time. As a result, a manufacturer utilizing condition based maintenance could better plan its spares production and save millions of dollars in unnecessary production, warehousing and inventory taxes.

There is however a catch to condition-based maintenance. A closed feedback loop system of information related to the use of each product must be provided. Without first-hand knowledge of how a product is being used after it is sold and deployed to the field, a manufacturer or service provider has no real way of knowing when components will wear out based on usage, and must therefore default back to using one or both of the first two types of maintenance described above. Operators are in the best position to gather this first hand knowledge, but most are too busy operating and making money with the product and have little time, money and/or inclination to attempt to capture this information to provide feedback to the manufacturer or service provider, even though it is in their own best interest to do so.

In an attempt to gather useful information from the field, a variety of methods have been used to try and solve the collection of product usage data. On the low end, customer surveys, feedback forms, and interaction with field support personnel have been the primary means of obtaining a rudimentary form of feedback. For complex and expensive products, such as aircraft engines, the most common form is that of paper-based operational logs. This is a highly manual and painful method of collecting operational information. Over the years, computer collection systems have tried to make this process easier, but they still require a great deal of manual intervention.

More recent advances have involved the incorporation of automated data recording devices onto products, such as engine data units (or EDUs), which are used on turbine engines, and which communicate with an electronic engine control (EEC) system and record operational data using a variety of sensors. However, it is still extremely difficult and costly to gather information from these data collection devices, as it must be done manually by mechanics in the field using specialized equipment or laptop computers temporarily cabled to the EDU or EEC, and with which they usually have little familiarity or interest. The only other option is to wait until the product is returned to a shop environment for a major overhaul and repair, at which point the data from a preventative maintenance perspective is moot, and useful only from a post analysis or fleet average perspective.

A number of industries normally attempt to gather product usage intelligence through manual inspections and, more recently, laptop computer downloads performed concurrently with scheduled or on-demand maintenance service calls. This is normally accomplished by one of two methods: sending the service person to the product, bringing the product to a service center, or both. Examples of the former include products with fixed installations, such as elevators, HVAC systems, nuclear power plants, and large home appliances. Examples of the latter include automobiles, small home appliances, home electronics equipment, lawn-mowers, or anything small enough to be easily carried or shipped. Both methods are inefficient and result in significant down time.

With advances in low cost computing and the advent of wireless technologies and the Internet, companies are now looking at how they can collect product usage intelligence in an automated and remote fashion. Many of the systems which have evolved such as VHF frequency, cell phone, or wireless land-based data download methods, tend to be very expensive as have attempts at using emerging technologies to accomplish essentially the same thing, i.e., remote data file compression and download to a central location using a public or private network/Internet where the information can then be manually uncompressed and analyzed. As a result, the high cost associated with such methods restricts the application of wireless remote monitoring to high value products, such as jet aircraft and helicopters. Thus, there remains a need for a low cost, wireless system which accurately ascertains the condition of a deployed product based upon actual wear, tear, and usage and presents information about that condition to a user, a manufacturer, an operator, or any other interested party, that is deployable with the product and that provides greater flexibility and interaction than simple data downloading.

In addition to the above, it would be advantageous if a system were to be provided which would allow for existing aircraft engines to be retrofitted-to have wireless communication capabilities. Such a system would enable ground personnel at distant locales to access a website containing information related to a given aircraft engine, as well as enable two-way communication between the aircraft engine and the remote locations by way of the Internet. It would also be advantageous if such a retrofit option were to be provided at a minimum of cost, preferably taking advantage of existing resources already present within the aircraft engine.

SUMMARY OF THE DISCLOSURE

In accordance with one aspect of the disclosure, a gas turbine engine is disclosed which comprises a compressor section, a combustion section, a turbine section, a casing, an electronic control box, and a microserver card. The combustion section is downstream of the compressor section while the turbine section is downstream of the combustion section. The casing surrounds the compressor section, combustion section and turbine section. The electronic control box is mounted to the casing and controls and monitors operation of the engine, while the microserver card is mounted in the electronic control box.

In accordance with another aspect of the disclosure, a system for communicating with the deployed product is disclosed which comprises a deployed product, an electronic control box mounted to the deployed product, a microserver card and a computing device. The microserver card is mounted in the electronic control box and receives data about the deployed product and hosts a web page through which the received data is accessible. The computing device is remote from the deployed product and is adapted to wirelessly access the microserver web page.

In accordance with a still further aspect of the disclosure, the deployed product is disclosed which comprises a housing, an electronic control box mounted to the housing, and a microserver card mounted in the electronic control box. The microserver hosts a web page and generates a wireless system around the deployed product.

In accordance with a still further aspect of the disclosure, a method of communicating with the deployed product is disclosed which comprises the steps of installing a microserver card into an electronic control box of the deployed product, hosting a web page on the microserver card, and accessing the web page wirelessly over the Internet.

In accordance with a still further aspect of the disclosure, an electronic controller for an engine is disclosed which comprises means for controlling the engine, and a microserver for generating a wireless system adapted to connect to the Internet.

These and other aspects and features of the disclosure will become more readily apparent upon reading the following detailed description when taken in conjunction with the accompanying drawings.

Figure 1:
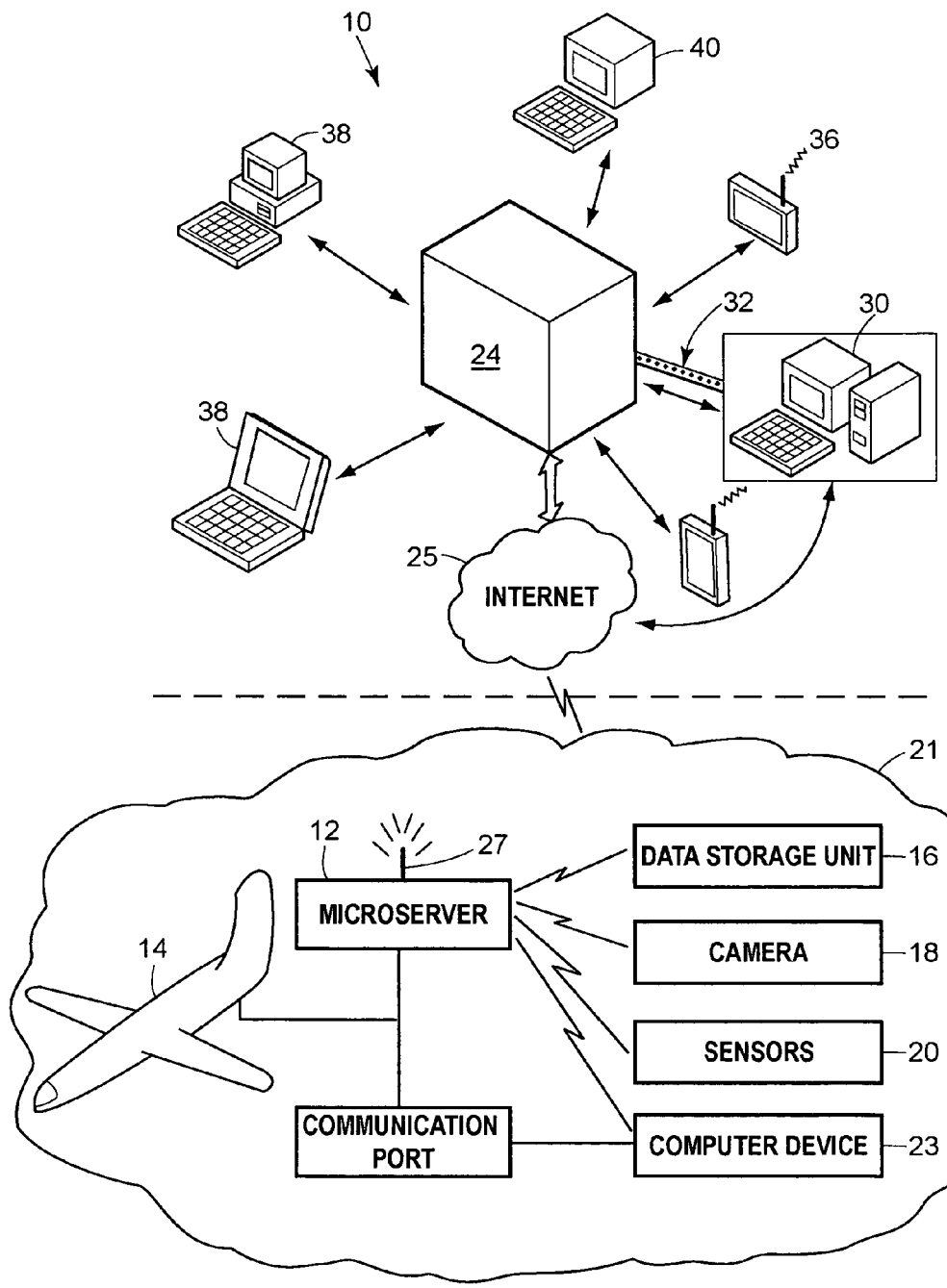
FIG. 1 is a schematic representation of an integrated system for monitoring, gathering data about, and disseminating data about a deployed product in accordance with one embodiment of the present disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Referring now to FIG. 1, a system 10 is presented which is capable of monitoring a deployed product, gathering data about the deployed product, and disseminating the data to interested parties. It is also capable of monitoring and restricting access to its data, and can accept data for storage or integration within the product itself, such as firmware revision updates. As used herein, the term "deployed product" has broad applicability and refers to any product, component, or system on a variety of machines including but not limited to a vehicle, a HVAC system, or an elevator/escalator system, such as a propulsion system on a vehicle, a compartment of a vehicle, or a braking system for a vehicle, wherein the vehicle is any one of a number of movable devices including aircraft and elevator cars.

The system 10 includes a server 12 located on the deployed product or movable platform 14. The movable platform 14 may be a boat, an airplane, a spacecraft, an automobile, a truck, or any other entity that is movable with an airplane being depicted for ease of understanding. The server 12 may monitor the condition of and/or gather data about the deployed product in a number of ways. For example, the server 12 may be connected to or integrated with a vehicle data storage unit 16 which contains data about the deployed product. The server 12 may also be connected to a video camera 18, such as video web camera, to provide pictures, in real-time or on a delayed basis, of the deployed product. Still further, the server 12 may be connected to a number of sensors 20, such as a vibration sensor or a temperature sensor, which provide additional or environmental information about the condition of the deployed product.

The server 12 may be programmed in any suitable language known in the art to gather the data about the deployed product and present the data to interested parties in a desired format. For example, the server 12 may be used to host a web page which provides information about one or more deployed products on the movable platform. The web page may have a menu which allows an interested party to gain access to gathered data about a particular deployed product. The data about the deployed product(s) may be organized on the server 12 and presented in any desirable format or manner. The server 12 may also be programmed to allow an interested party to carry out diagnostic operations on the deployed product(s) and/or to upgrade software associated with the deployed product(s). By providing the server 12 on the deployed product 14, a wireless system or intranet 21 is provided around the entire deployed product 14 enabling wireless communication to any electronic device thereon as will be described in further detail herein.

While it is contemplated that the system 10 of the present disclosure would primarily be used to allow interested parties in remote locations to obtain information about a deployed product, there will be times when a mechanic or an engineer may want to interact with the server 12 while he or she is onboard the movable platform 14. To this end, the server 12 may be provided with a local IUSB or other communications port 22 for direct hook-up. A mechanic or engineer could then gain access to the server 12 by hooking up a promtop, laptop computer or another device 23 such as a video borescope or a bar code reader to the communications port 22. Other examples of communication ports through which access may be gained to server 12 include wireless peer-to-peer communication links. The mechanic or engineer could then conduct a desired diagnostic operation or even fix a problem with the deployed product. Similarly, any passenger on board the deployed product 14 could use his or her own computer device 23 to access the server 12 and thus the Internet 25, again as will be described in further detail herein.

The server 12 may comprise any suitable computer or processing unit known in the art. The server 12 may be a hand-held sized microserver using a Linux-based operating system or, as will be described in further detail herein, may be a card adapted to be inserted into a larger computing device. Further, the server 12 may be provided with its own web address, a firewall, and security protocols known only to selected individuals, such as the manufacturer of the deployed product.

In accordance with the present disclosure, the server 12 is capable of being accessed by interested parties via a portal 24 and the Internet or world wide web 25. To this end, the server 12 may have a communications device, such as a modem, built within it to allow communication between the server 12 and the portal 24. The communication device may allow for radio frequency communications such as cellular communication, satellite communication, and/or wireless communication between the server 12 and the portal 24. In addition, communications between the server 12 and the portal 24 may be achieved by optical means such as an infrared link.

The portal 24 is hosted by an external server which may be any suitable server known in the art. The server hosting the portal 24 also has appropriate communication means associated with it to allow it to gain access to and be accessed by the server 12.

Data gathered by and stored on the server 12 may be downloaded to the portal 24 as desired. For example, the server 12 may be programmed to periodically download data to the server hosting the portal 24 or to download data on specific events such as when an aircraft lands or when a truck or automobile reaches a particular destination. The server 12 may also download data to the portal 24 upon the activation of a switch by an operator onboard the moving platform. Alternatively, the portal server may upload data to the microserver, such as product firmware revisions or technical manuals for access by interested parties. The server 12 may include an antenna 27 or the like to facilitate such wireless communication.

The portal 24 may be provided with a number of software tools called gadgets to automatically analyze, organize, and sort the data which has been received from the server 12. The data is preferably sorted so that different communities gain access to different portions of the data. For example, actual and potential customers of a vendor of a deployed product may form one community and have access to certain data, while support engineers and product designers may form a second community and have access to another form of the data. As can be seen from the foregoing discussion, the portal 24 offers great flexibility as to how and to whom the data is disseminated. Still further, the portal 24 provides virtual shared spaces which allow for the common space posting and access of information about a deployed product in a shared awareness between customers, support engineers, field operatives, and even product designers. The portal 24 may also be designed to provide chat rooms, bulletin boards, and on-line meeting capabilities where interested parties can communicate with each other.

One of the advantages to using the portal 24 is that its functionality can be carried out in a secure, user friendly, web-based environment. Members of a particular community can log in by presenting an identification and/or a password and gain access to current information about a deployed product. Another advantage to using the portal 24 is that it can be used to upload data, information, instructions, software, technical publications, diagnostic programs, etc. to the server 12. Thus, an engineer can perform diagnostic tests on a deployed product from a remote location using the Internet. Similarly, a service engineer working on the aircraft can gain access to a technical publication outlining how to regain a certain situation, for example, through the server 12. As the communication is two way, access, upload, download, and execution of all such information and data can be performed at the deployed product or remote locations.

Access to the portal 24 may be gained in a number of different ways by a variety of devices as described below. For example, an interested party can communicate with the portal 24 through his/her personal computer 38 and the web browser on the computer 38. The computer 38 may be a PC workstation at the office of a user or a laptop or PC at the home of the user. Even a computer 40 in an Internet cafe may be used to gain access to the portal 24. A wireless PC tablet 36 on the shop floor of a manufacturer of the deployed product may also be used to communicate with the portal 24. The portal 24 may also be in communication with the internal network 30 of the manufacturer of or a vendor of the deployed product. When the portal 24 is to be in communication with the network 30, a secure data pipe 32 may be used for crawlers for automated data exchange. If desired, the portal 24 may communicate with the internal network 30 via a wireless PDA.

The system 10 may also be configured to allow the internal network 30 to communicate directly with the server 12 via the Internet by dialing up the web address for the server 12. When in such a configuration, a firewall may be provided between the internal network 30 and the server 12.

As can be seen from the foregoing discussion, the system 10 of the present disclosure has broad applicability and can be used for a wide variety of purposes. For example, as previously mentioned, the system 10 can be used by an engineer working for a manufacturer of the deployed product to gain access to the server 12 and to then carry out a diagnostic operation or a fix on a particular deployed product. All of this can be carried out while the movable platform 14 is in motion and in a location remote from the engineer, thus avoiding having to return a deployed product to a manufacturer for diagnosis and repair.

The system 10 may also be used to check the status of a deployed product. For example, an operator of a fleet of airplanes having a network 30 may contact the server 12 on a particular airplane, either directly or through the portal 24, and learn the location of and the status of that airplane. Alternatively, a manufacturer of a jet engine may access the server 12 through its network, again either directly or through the portal 24, to ascertain the condition of a particular jet engine or a particular component on the jet engine to determine when that engine or component may require servicing, and to collect data in determining product and fleet averages for improved product design and support. This can save the manufacturer unnecessary warranty, maintenance wear, and spare parts production costs.

One advantage to the system of the present disclosure is that it may be easily and cheaply installed into a vehicle. For example, the server 12 may be installed in the cabin of an aircraft, by using existing test ports already wired into the engine/airframe.

Figure 2:
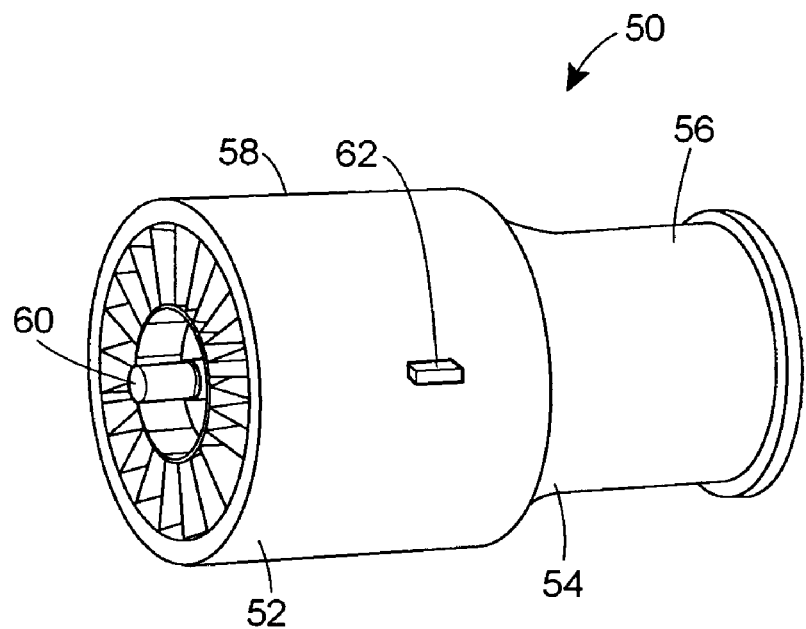
FIG. 2 is a perspective view of one embodiment of a gas turbine engine constructed in accordance with the teachings of the disclosure.

Referring now to FIG. 2, a gas turbine engine retrofitted or constructed in accordance with the teachings of the present disclosure is generally referred to by reference numeral 50. While the following description will be given with respect to the engine 50, it is to be understood that the teachings of the disclosure can be used in conjunction with any other deployed product to generate a wireless system around the deployed product and thus make two-way wireless communication between the deployed product and a remote computing device possible.

As is conventional, the gas turbine engine generally includes a compressor section 52, a combustion section 54, and a turbine section 56 surrounded by a fan case 58. Rotation of the compressor section 52 causes ambient air to be ingested and compressed before being communicated to though a diffuser and into the combustion section 54. In the combustion section 54, the compressed air is combined with fuel and ignited, thereby generating hot, rapidly expanding combustion gases which get communicated to the turbine section 56. The blades (not shown) of the turbine section 56 rotate as a result, and as they are mounted to the same shaft assembly 60 as the compressor section 52, the engine cycle is perpetuated.

Figure 3:
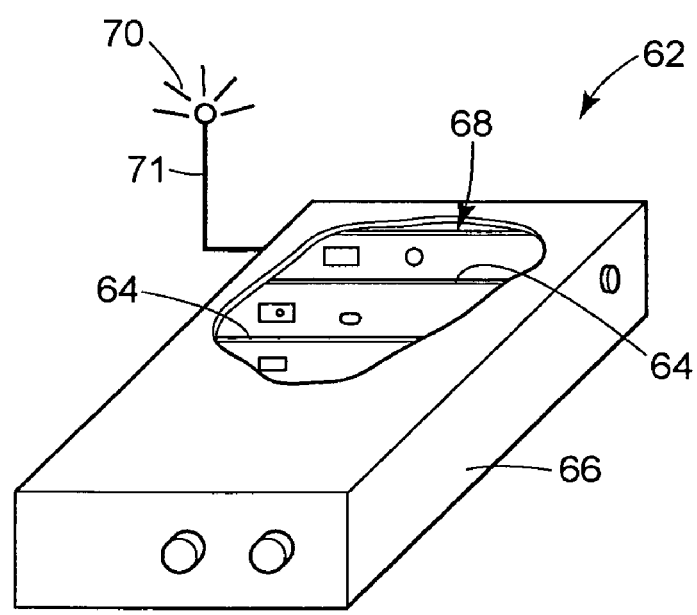
FIG. 3 is a perspective view of a engine controller retrofitted with one embodiment of a microserver card in accordance with the teachings of the disclosure.

As also shown in FIG. 2, and FIG. 3, an electronic controller or control box 62 is mounted to the fan case 58. The controller 62 is wired to various components and sensors in the engine 50 for operation, modification and recordation of engine operation. The controller 62 can be provided in many forms including, but not limited to, a FADEC (Full Authority Digital Electronic Control) or EEC (Electronic Engine Control), and may include a number of circuitry boards or cards 64 mounted within a housing 66. The controller 62 may work in conjunction with an EDU (Electronic Data Unit) or Data Management Unit (DMU) for storage of data related to engine operation. The means for controlling the engine may employ any known technology, but generally performs as an electronic fuel control or injector taking power and throttle commands/signals from the cockpit and adjusting engine control to provide the desired power. The EEC or other electronic control may include a plurality of cards or boards, including a motherboard, slidably mounted in a rack of the EEC. The cards/boards receive inputs from the cockpit and various engine sensors, and outputs signals to various valves and controls on the engine to effectuate its operation.

However, departing from prior art engine control, the engine controller 62 further includes a microserver engine control card 68. The microserver engine control card 68 can be installed in the housing 66 along with the other cards 64 and immediately provide a relatively inexpensive apparatus and method by which the existing engine controller 62 can generate a wireless system enabling two-way wireless communication through the Internet. The microserver card 18 generates a local wireless system or intranet 70 in and around the deployed product capable of operating in conjunction with, or independent from, the Internet. An antenna 71 may be provided to facilitate such communication.

Figure 4:
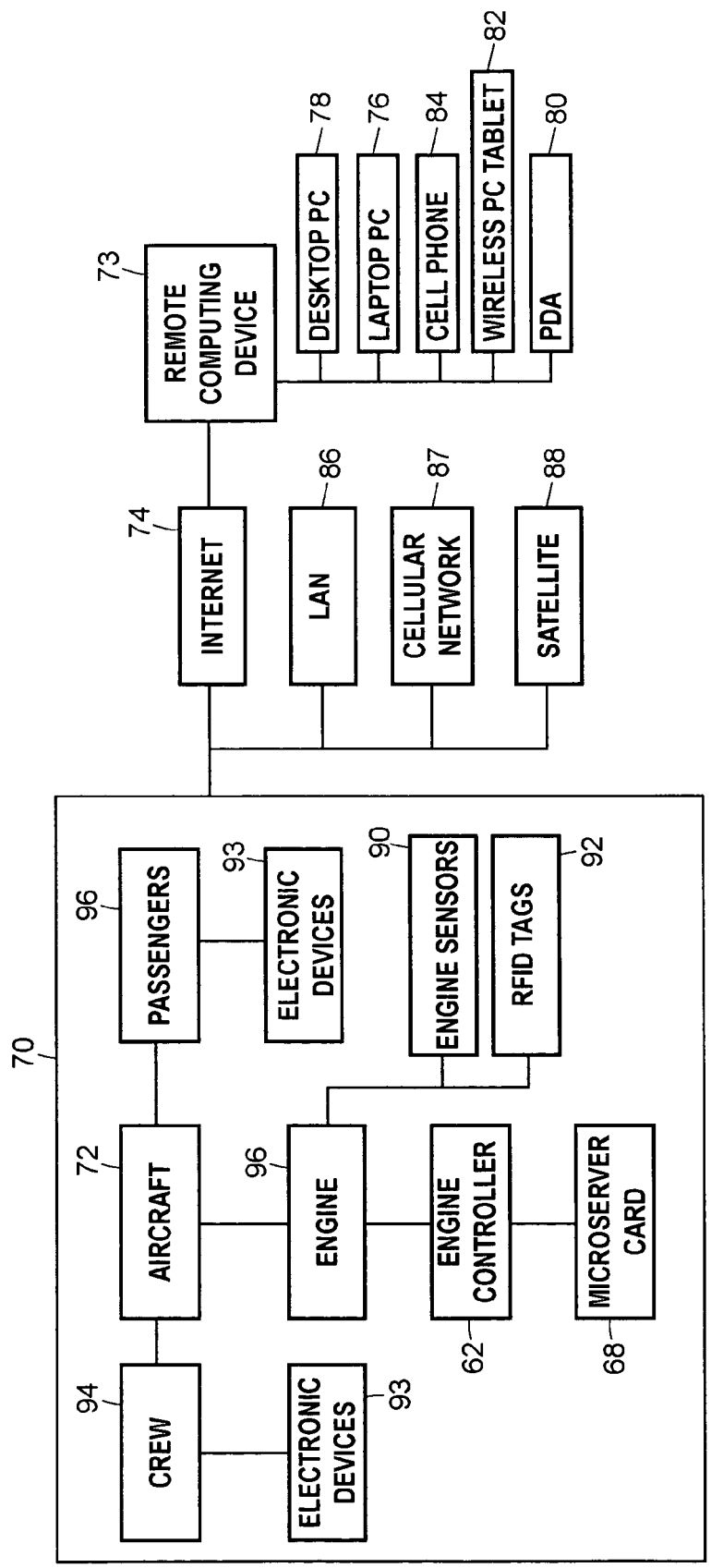
FIG. 4 is a block diagram illustrating one embodiment of a system for communicating with a deployed product in accordance with the teachings of the disclosure.

More specifically, as indicated in FIG. 4, once the microserver card 68 is installed, the wireless system 70 is generated around the entire deployed product, in this case including the engine 50 and the entire aircraft 72 to which the engine 50 is attached. This wireless system 70 enables significant communication on many levels as will described in detail below. First, the wireless system 70 enables communication with remote locations such as remote computing devices 73. To facilitate this communication, as indicated above, the microserver card 68 may serve as a host for a web page accessible through the Internet 74. Accordingly, individuals wishing to gain information as to the operating data generated by the engines 50, for example, can simply log into the given website for that engine by way of the Internet 74 and the remote computing device 73 and be immediately connected to the microserver 68, and in turn be made privy to the data associated with the engine 50.

As indicated above, the remote computing device 73 can be provided in the form of any currently known or understood computing device including, but not limited to, laptop computers 76, desktop computers 78, personal digital assistants 80, wireless PC tablets 82, and cellular phones 84. The wireless system 70 may connect to the Internet 74 by any number of mechanisms including a local area network (LAN) 86, a cellular network 87, and a satellite 88.

In addition to enabling wireless communication with remote computing devices 72, the microserver card 68 further enables wireless communication with various engine sensors 90 and RF (radio frequency) identification tags 92 of components within the engine 50. In so doing, not only can the microserver card 68 gain access to engine control data through the other cards 64 of the engine controller 62, but the microserver card 68 can also receive data directly from the sensors 90 and tags 92 in a wireless fashion. As a result, the remote computing device 73 can as well. It can therefore be seen that the microserver card 68 can act as a coordinating server in communication with other computing devices, servers and systems on board the deployed product.

It is also important to understand that once the microserver card 68 is installed onboard the engine 50, that microserver 68 immediately serves as both a client and a server. More specifically, by hosting a webpage, the microserver 68 is a client to the internet and every remote computing device 73. As every engine 50 on the aircraft could include its own microserver and webpage, a remote user could log into the website for a particular engine 50 and immediately gain access to the operating data of the engine in a real-time capacity. Predictive maintenance is therefore enhanced. The webpage may have an IP address available for various Internet protocols including, but not limited to, HTTP, FTP, SMTP, UDP, ECHO, SSH, TELNET, NAMESERVER, BOOT PS, BOOT PC, TFTP, KERBEROS, POP3, NNTP, IMAP, SNMP, BGP, IMAP3, LDAP, and HTTPS.

The microserver 68 is a server to every computing device 93 on the aircraft 72. This includes not only the engine controller 62, but every computing device of the crew 94 and passengers 96. For example, one of the passengers 96 may wish to log into the Internet 74 to gain access to email, among other things. The passenger 96 can access the Internet 74 to do so by using his or her PDA 93 or the like and taking advantage of the wireless system/intranet 70, or hot spot, generated by the microserver card 68. In so doing, it can be seen that the microserver 68 provides a portal to the Internet 74 in its server capacity.

In operation, it can therefore be seen that the microserver card taught by the pending disclosure enables existing deployed products to be easily retrofitted to be Internet accessible. The microserver card can be plugged into an existing electronic controller to generate a wireless system surrounding the deployed product and thus enable two-way communication with the deployed product by way of the Internet.

What is claimed is:

1. A gas turbine engine, comprising:
   a compressor section;
   a combustion section downstream of the compressor section;
   a turbine section downstream of the combustion section;
   a casing surrounding the compressor section, combustion section and turbine section;

an electronic controller mounted to the casing, the electronic controller controlling and monitoring operation of the engine and having a microserver, wherein the microserver generates a wireless system surrounding the engine and adapted to connect to the Internet.

2. The engine of claim 1, wherein the microserver resides on a card.

3. The gas turbine engine of claim 2, wherein the microserver card hosts a web page, wherein the webpage has an IP address available for a plurality of Internet protocols.

4. The gas turbine engine of claim 2, wherein the microserver card is communicably coupled to other cards within the electronic control box.

5. The gas turbine engine of claim 1, wherein the microserver is communicably coupled to sensors installed on the engine.

6. The gas turbine engine of claim 5, wherein the microserver is hard-wired to the sensors.

7. The gas turbine engine of claim 5, wherein the microserver communicates with the sensors wirelessly.

8. The gas turbine engine of claim 7, wherein the microserver communicates by way of radio frequency identification tags.

9. The gas turbine engine of claim 1, wherein the microserver card connects to the Internet by way of a local area network.

10. The gas turbine engine of claim 1, wherein the microserver card connects to the Internet by way of cellular network.

11. The gas turbine engine of claim 1, wherein the microserver card connects to the Internet by way of satellite.

12. The gas turbine engine of claim 1, wherein the electronic controller comprises an electronic control box mounted to the casing and the microserver card is mounted in the electronic control box.

13. The gas turbine engine of claim 12, wherein the microserver card receives data about the gas turbine engine and hosts a web page through which said data is accessible.

14. The gas turbine engine of claim 13, wherein the microserver card is programmed to allow an interested party to carry out diagnostic operations on the gas turbine engine.

15. The gas turbine engine of claim 13, wherein the microserver card is programmed to download said data on an occurrence of a specific event.

16. The gas turbine engine of claim 1, further comprising an antenna for facilitating communication between the microserver card and the Internet.

* * * * *